United States Patent
Vukkadala et al.

(10) Patent No.: US 9,779,202 B2
(45) Date of Patent: Oct. 3, 2017

(54) PROCESS-INDUCED ASYMMETRY DETECTION, QUANTIFICATION, AND CONTROL USING PATTERNED WAFER GEOMETRY MEASUREMENTS

(71) Applicant: KLA-Tencor Corporation, Milpitas, CA (US)

(72) Inventors: Pradeep Vukkadala, Newark, CA (US); Jaydeep Sinha, Livermore, CA (US); Jong-Hoon Kim, Fremont, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 76 days.

(21) Appl. No.: 14/867,226

(22) Filed: Sep. 28, 2015

(65) Prior Publication Data

US 2016/0371423 A1    Dec. 22, 2016

Related U.S. Application Data

(60) Provisional application No. 62/183,105, filed on Jun. 22, 2015.

(51) Int. Cl.
*G06F 17/50* (2006.01)
*G03F 7/20* (2006.01)
*G03F 1/44* (2012.01)

(52) U.S. Cl.
CPC ...... *G06F 17/5081* (2013.01); *G06F 17/5068* (2013.01); *G03F 1/44* (2013.01); *G03F 7/705* (2013.01); *G06F 2217/12* (2013.01)

(58) Field of Classification Search
CPC ...... G06F 17/5081; G06F 1/144; G06F 7/705; G06F 17/5068; G06F 2217/12; H01L 22/20

See application file for complete search history.

(56) References Cited

U.S. PATENT DOCUMENTS 6,077,756 A * 6/2000 Lin .................. H01L 22/34
257/797
6,838,217 B1 * 1/2005 Chen ................ G03F 7/70633
430/22

(Continued)

OTHER PUBLICATIONS

Servin et al; "Mask contribution on CD & OVL errors budgets for Double Patterning Lithography"; Year: 2009 ; 25th European Mask and Lithography Conference; pp. 1-13.*

(Continued)

*Primary Examiner* — Helen Rossoshek

(74) *Attorney, Agent, or Firm* — Suiter Swantz pc llo

(57) ABSTRACT

Systems and methods to detect, quantify, and control process-induced asymmetric signatures using patterned wafer geometry measurements are disclosed. The system may include a geometry measurement tool configured to obtain a first set of wafer geometry measurements of the wafer prior to the wafer undergoing a fabrication process and to obtain a second set of wafer geometry measurements of the wafer after the fabrication process. The system may also include a processor in communication with the geometry measurement tool. The processor may be configured to: calculate a geometry-change map based on the first set of wafer geometry measurements and the second set of wafer geometry measurements; analyze the geometry-change map to detect an asymmetric component induced to wafer geometry by the fabrication process; and estimate an asymmetric overlay error induced by the fabrication process based on the asymmetric component detected in wafer geometry.

17 Claims, 5 Drawing Sheets

(56) References Cited

U.S. PATENT DOCUMENTS

| | | | | |
|---|---|---|---|---|
| 6,928,628 B2* | 8/2005 | Seligson | ................ | G03F 7/705 382/151 |
| 7,042,569 B2* | 5/2006 | Sezginer | ............ | G03F 7/70633 356/400 |
| 7,061,627 B2* | 6/2006 | Opsal | ................ | G03F 7/70633 356/601 |
| 7,081,038 B2* | 7/2006 | Ina | ........................ | B24B 49/12 451/285 |
| 7,310,789 B2* | 12/2007 | Seligson | ................ | G03F 7/705 716/52 |
| 7,523,438 B2* | 4/2009 | Hsu | ........................ | G03F 1/32 430/5 |
| 7,656,518 B2* | 2/2010 | Den Boef | ......... | G01N 21/4785 356/237.2 |
| 7,666,559 B2* | 2/2010 | Schulz | .............. | G03F 7/70633 257/48 |
| 8,159,650 B2* | 4/2012 | Okita | ................ | G03F 7/70516 355/53 |
| 8,566,756 B2* | 10/2013 | Okita | ................ | G03F 7/70525 355/52 |
| 8,767,183 B2* | 7/2014 | Den Boef | ......... | G03F 7/70633 355/55 |
| 8,867,020 B2* | 10/2014 | Smilde | ................ | G03F 7/70483 355/53 |
| 8,998,678 B2* | 4/2015 | Duescher | ............... | B24B 37/32 451/28 |
| 9,087,176 B1 | 7/2015 | Chang et al. | | |
| 2004/0129900 A1* | 7/2004 | Den Boef | ............ | G03F 9/7046 250/559.3 |
| 2006/0123919 A1 | 6/2006 | Lovell et al. | | |
| 2006/0197950 A1 | 9/2006 | Smith et al. | | |
| 2011/0080585 A1* | 4/2011 | Rabello | ................ | G01N 21/211 356/368 |
| 2011/0134419 A1* | 6/2011 | Fuchs | ................ | G03F 7/70633 356/237.5 |
| 2012/0013881 A1 | 1/2012 | Den Boef et al. | | |
| 2012/0123581 A1* | 5/2012 | Smilde | ............... | G03F 7/70483 700/105 |
| 2013/0089935 A1 | 4/2013 | Vukkadala et al. | | |
| 2013/0308142 A1* | 11/2013 | Straaijer | ............... | G01B 11/24 356/625 |
| 2014/0107998 A1 | 4/2014 | Vukkadala et al. | | |
| 2015/0072430 A1* | 3/2015 | Yang | ................... | C12N 5/0068 435/396 |
| 2015/0120216 A1 | 4/2015 | Vukkadala et al. | | |
| 2015/0146188 A1* | 5/2015 | Lyulina | ............... | G03F 7/70633 355/77 |
| 2016/0223322 A1* | 8/2016 | Liu | ..................... | G03F 7/70633 |

OTHER PUBLICATIONS

Brunner et al., Characterization of wafer geometry and overlay error on silicon wafers with nonuniform stress, Journal of Micro/Nanolithography, MEMS, and MOEMS, Oct.-Dec. 2013, pp. 043002-1-043002-12, vol. 12, Issue 4, SPIE.

Gong et al., Determining local residual stresses from high resolution wafer geometry measurements, Journal of Vacuum Science & Technology B, vol. 31, Issue 5, Sep.-Oct. 2013, pp. 051205-1-051205-8, © 2013 American Vacuum Society.

Turner et al., Monitoring Process-Induced Overlay Errors through High-Resolution Wafer Geometry Measurements, Proceedings of SPIE, vol. 9050, p. 905013-1-905013-9, Apr. 2, 2014, © 2014 SPIE.

Turner et al., Relationship between localized wafer shape changes induced by residual stress and overlay errors, Journal of Micro/Nanolithography, MEMS, and MOEMS, vol. 11, Issue 1, Jan.-Mar. 2012, pp. 013001-1-013001-8, © 2012 SPIE.

International Search Report for Application No. PCT/US2016/036460 dated Aug. 19, 2016, 3 pages.

* cited by examiner

PROCESS-INDUCED ASYMMETRY DETECTION, QUANTIFICATION, AND CONTROL USING PATTERNED WAFER GEOMETRY MEASUREMENTS

CROSS-REFERENCE TO RELATED APPLICATIONS

The present application claims the benefit under 35 U.S.C. §119(e) of U.S. Provisional Application Ser. No. 62/183,105, filed Jun. 22, 2015. Said U.S. Provisional Application Ser. No. 62/183,105 is hereby incorporated by reference in its entirety.

TECHNICAL FIELD

The disclosure generally relates to the field of semiconductor fabrication, and particularly to process-induced asymmetry detection, quantification, and control techniques.

BACKGROUND

Thin polished plates such as silicon wafers and the like are a very important part of modern technology. A wafer, for instance, may refer to a thin slice of semiconductor material used in the fabrication of integrated circuits and other devices. Other examples of thin polished plates may include magnetic disc substrates, gauge blocks and the like. While the technique described here refers mainly to wafers, it is to be understood that the technique also is applicable to other types of polished plates as well. The term wafer and the term thin polished plate may be used interchangeably in the present disclosure.

Fabricating semiconductor devices typically includes processing a substrate such as a semiconductor wafer using a number of semiconductor fabrication processes. For example, lithography is a semiconductor fabrication process that involves transferring a pattern from a reticle to a resist arranged on a semiconductor wafer. Additional examples of semiconductor fabrication processes include, but are not limited to, chemical-mechanical polishing, etching, deposition, and ion implantation.

Generally, certain requirements are established for the flatness and thickness uniformity of the wafers. However, the various process steps performed during fabrication may alter stresses in the thin films deposited on the wafers and result in elastic deformation that can cause significant distortions, including in-plane distortions (IPD) and/or out-plane distortions (OPD). Such distortions may lead to errors in downstream processes. For example, distortions may lead to overlay errors in lithographic patterning or the like.

Asymmetric overlay error signatures have also been observed during semiconductor fabrication. Asymmetricity in this case is defined as signatures that deviate from rotational symmetry. For example an overlay signature is said to be fully symmetric or axisymmetric if the overlay error varies along the radius of the wafer but at a given radial location the value of overlay error is the same irrespective of the angular location on the wafer. Components of overlay error signature that deviate from axisymmetry are said to be asymmetric components/signatures. It is noted that a majority of these asymmetric signatures tend to be non-correctable by traditional and advanced lithography scanner-based overlay correction strategies. These asymmetric signatures may be induced by various process tools such as film deposition, thermal annealing and the like. Therein lies a need for systems and methods to help address potential issues that may be caused by such asymmetric signatures.

SUMMARY

An embodiment of the present disclosure is directed to a method. The method may include: obtaining a first set of wafer geometry measurements of a wafer prior to the wafer undergoing a fabrication process; obtaining a second set of wafer geometry measurements of the wafer after the fabrication process; calculating a shape-change map based on the first set of wafer geometry measurements and the second set of wafer geometry measurements; analyzing the shape-change map to detect an asymmetric component induced to wafer geometry by the fabrication process; and estimating an asymmetric overlay error induced by the fabrication process based on the asymmetric component detected in wafer geometry.

A further embodiment of the present disclosure is also directed to a method. The method may include: obtaining a first set of wafer geometry measurements of a wafer prior to the wafer undergoing a fabrication process; obtaining a second set of wafer geometry measurements of the wafer after the fabrication process; calculating a shape-change map based on the first set of wafer geometry measurements and the second set of wafer geometry measurements; generating at least one of: an in-plane distortion map and a local shape curvature map of the wafer at least partially based on the shape-change map; and detecting a process-induced asymmetric component at least partially based on at least one of: the in-plane distortion map and the local shape curvature map of the wafer.

An additional embodiment of the present disclosure is directed to a system. The system may include a geometry measurement tool configured to obtain a first set of wafer geometry measurements of the wafer prior to the wafer undergoing a fabrication process and to obtain a second set of wafer geometry measurements of the wafer after the fabrication process. The system may also include a processor in communication with the geometry measurement tool. The processor may be configured to: calculate a shape-change map based on the first set of wafer geometry measurements and the second set of wafer geometry measurements; analyze the shape-change map to detect an asymmetric component induced to wafer geometry by the fabrication process; and estimate an asymmetric overlay error induced by the fabrication process based on the asymmetric component detected in wafer geometry.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
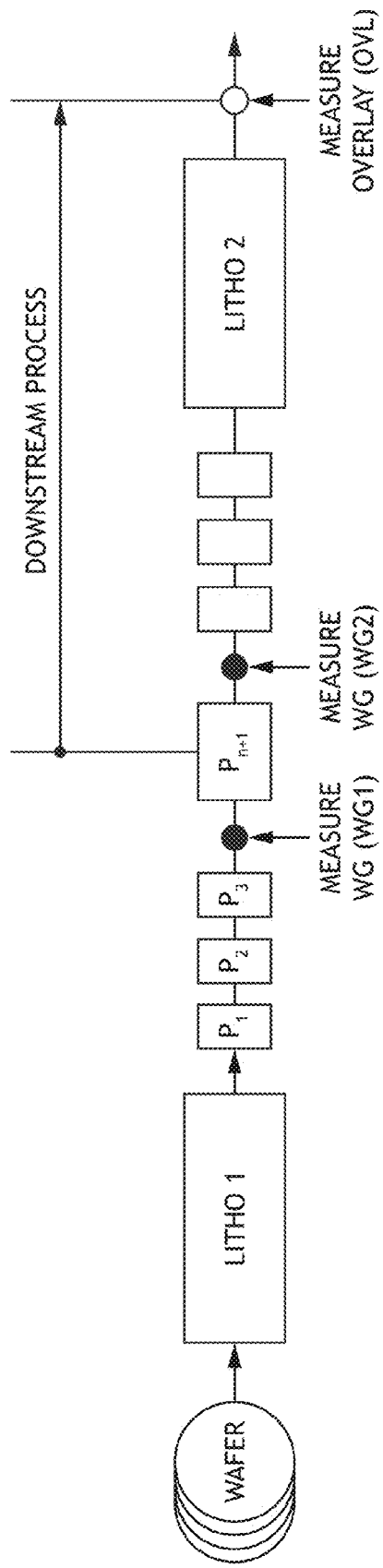
FIG. 1 is a block diagram depicting a fabrication process.

Embodiments in accordance with the present disclosure are directed to systems and methods to detect, quantify, and control process-induced asymmetric signatures using patterned wafer geometry measurements. More specifically, wafer geometry measurements may be utilized to assess process-induced overlay and stress. By using wafer geometry measurements that are high-resolution (e.g., 200 μm square pixel or smaller) and substantially distortion-free (e.g., achieved by holding wafers vertically), a detection process may be developed to detect in a production-line (as show in FIG. 1) if a suspected process step $P_{n+1}$ is likely to induce asymmetric signature in downstream overlay errors. The detection process may be further configured to quantify the degree of asymmetry and its impact on overlay. It is contemplated that providing the abilities to detect and quantify asymmetric signatures in this manner may allow potential problems to be captured well before it manifests (e.g., during lithography), and in certain implementations, the process step $P_{n+1}$ that is causing the asymmetry may be re-optimized and the wafers may be reworked, leading to significant cycle-time and cost savings.

Figure 2:
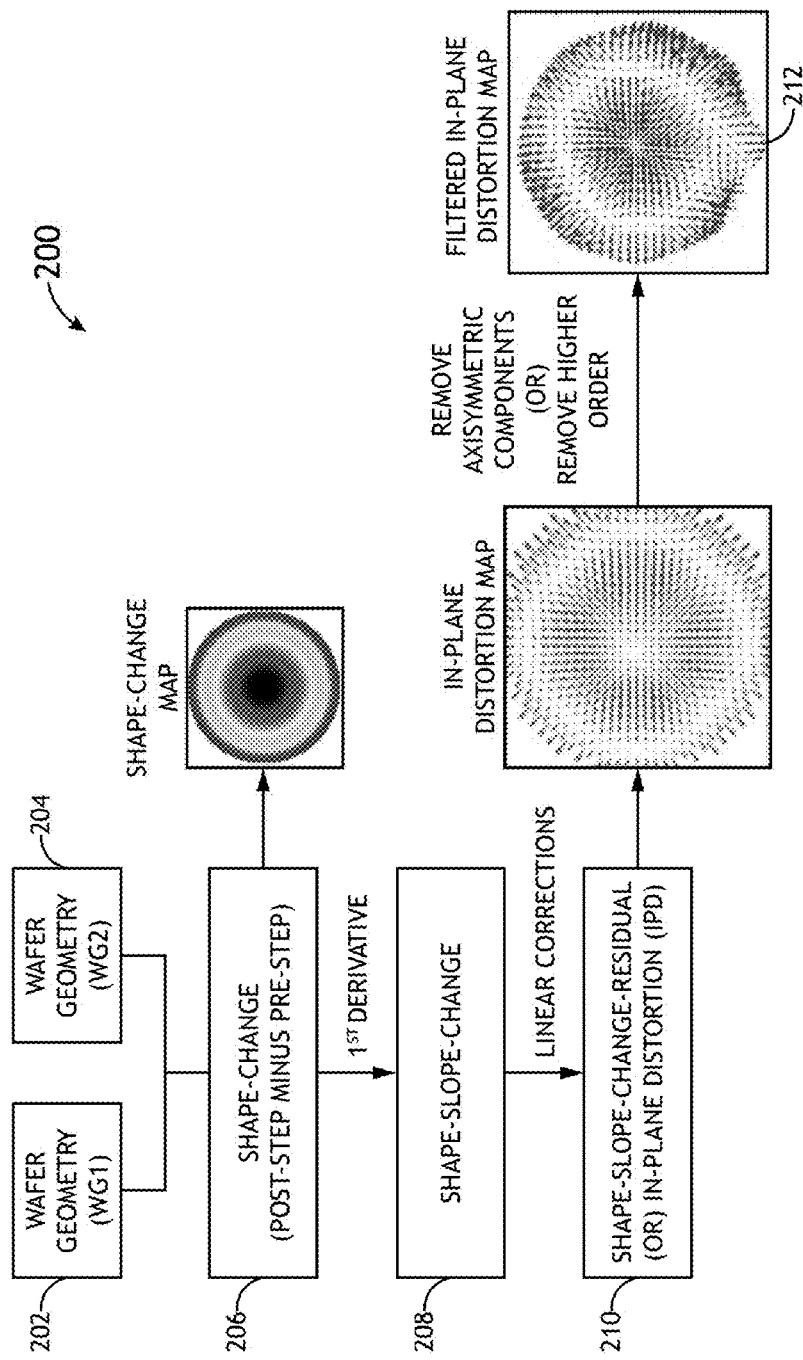
FIG. 2 is a flow diagram depicting an embodiment of a method for detecting process-induced asymmetric signatures using patterned wafer geometry measurements.

Referring now to FIG. 2, a flow diagram depicting an embodiment of a method 200 for detecting process-induced asymmetric signatures using patterned wafer geometry measurements is shown. In accordance with the present disclosure, a wafer geometry tool may be utilized to measure wafer geometry of a given wafer before (in step 202) and after (in step 204) a process step (referred to as step $P_{n+1}$ in FIG. 1). It is contemplated that the wafer geometry tool may include any wafer geometry measurement system capable of measuring geometry of semiconductor wafers. It is noted that the term wafer geometry may include wafer frontside height, backside height, thickness variation, flatness, and all consequent derivatives such as shape, shape-difference, nanotopography and the like. In some embodiments, the WaferSight Patterned Wafer Geometry (PWG) system from KLA-Tencor may be utilized as the wafer geometry tool. It is to be understood, however, that other types of wafer geometry measurement tools may also be utilized without departing from the spirit and scope of the present disclosure.

Once the geometry measurements of the wafer have been obtained in steps 202 and 204, step 206 may calculate the differences between the two sets of measurements. The result may be referred to as a geometry-change (or shape-change) map, which may then be further analyzed to obtain additional information. For instance, taking the first derivative (shown as step 208) of the shape-change map may provide information regarding changes of the surface slopes (e.g., in x- and y-directions). Subsequently, in-plane distortions (IPD) may be calculated in step 210 based on the changes of the surface slopes utilizing techniques such as that described in: Overlay and Semiconductor Process Control Using a Wafer Geometry Metric, U.S. patent application Ser. No. 13/476,328, filed May 21, 2012, which is herein incorporated by reference in its entirety. It is to be understood that other high order shape based models may also be utilized to calculate the IPD without departing from the spirit and scope of the present disclosure.

Once the IPD is calculated, asymmetry may be estimated in step 212 by analyzing the symmetry within the IPD map. It is contemplated that this symmetry analysis may be performed by fitting polynomials such as the Zernike polynomials or the like to the IPD map and setting the axisymmetric components to zero (i.e., nullify the axisymmetric components, a process which will be described in more details below). Alternatively and/or additionally, the symmetry analysis may also be performed by fitting polynomials to the IPD map to obtain higher order residual and setting certain lower-order terms to zero. In either approach, the end result of the symmetry analysis is a filtered IPD map that may indicate asymmetry information regarding the IPD map. The impact of asymmetry may then be assessed and reported/visualized based on this filtered IPD map (which may also be referred to as an IPD-based asymmetry map).

It is to be understood that while FIG. 2 depicts a shape-slope change residual based IPD calculation process, such a calculation process is merely exemplary and is not meant to be limiting. It is contemplated that other IPD calculation techniques, such as the Finite-Element modeling based IPD (FE-IPD) described in: Monitoring Process-Induced Overlay Errors through High-Resolution Wafer Geometry Measurements, Kevin Turner et al., Proceedings of SPIE, Vol. 9050, p. 905013, 2014 (which is herein incorporated by reference in its entirety), as well as other IPD calculation techniques not specifically mentioned herein, may be utilized to calculate the IPD without departing from the spirit and scope of the present disclosure.

It is noted that while performing the symmetry analysis on the IPD map may provide very useful prediction as to whether or not a process step will potentially induce asymmetry, using the IPD map alone may not provide enough information to accurately quantify the degree of asymmetry and its impact on overlay. In certain implementations, therefore, a combination of IPD metric and local shape curvature (LSC) metric may be used together to help quantify the degree of asymmetry and its overlay impact.

Figure 3:
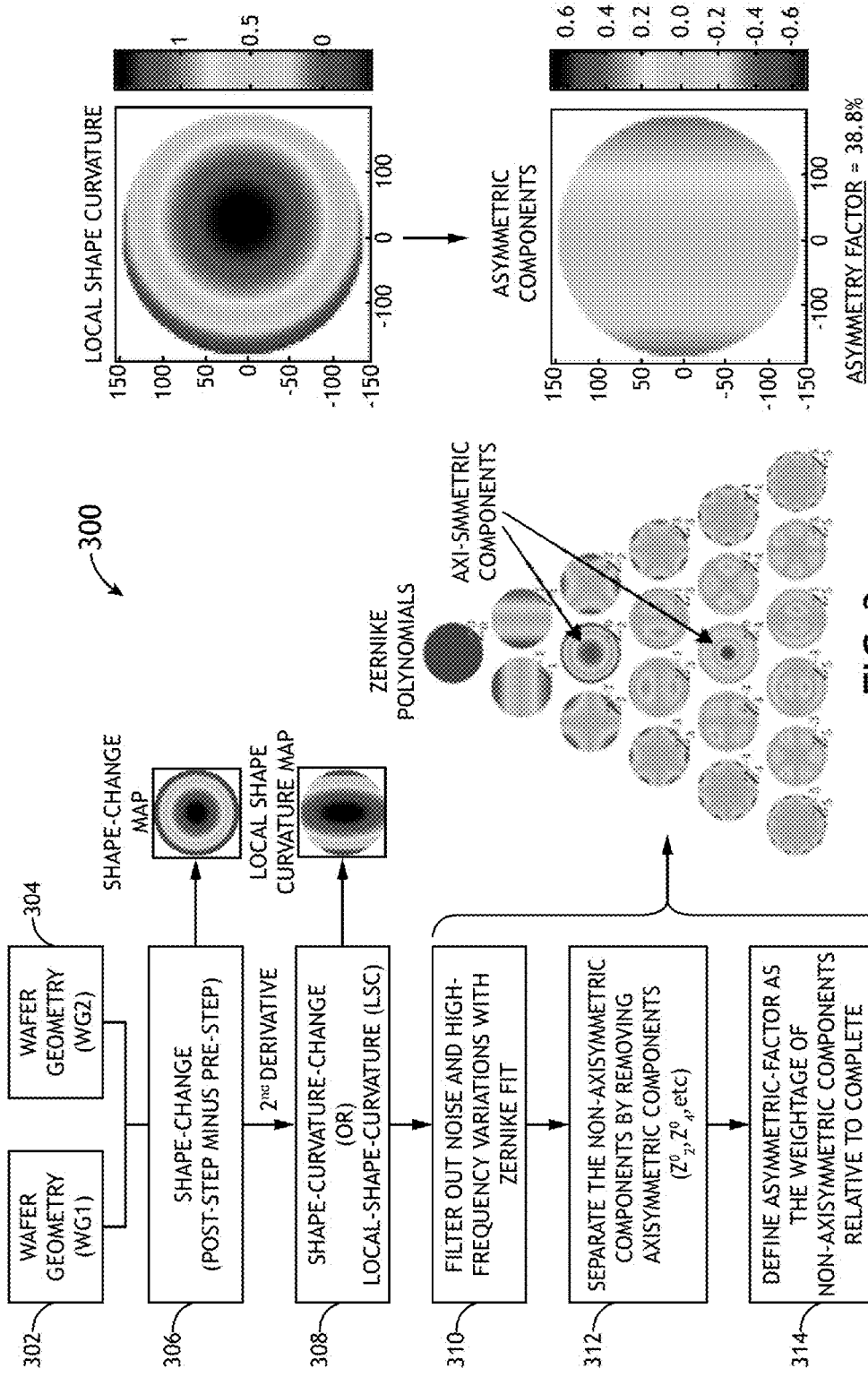
FIG. 3 is a flow diagram depicting an embodiment of a method for detecting and quantifying process-induced asymmetric signatures using patterned wafer geometry measurements.

The LSC metric is a shape-curvature-change metric that can be used as a predictor of process-induced stress, as described in: Determining Local Residual Stresses from High Resolution Wafer Geometry Measurements, J. Gong et al., Journal of Vacuum Science a Technology B (JVST B) 31, 051205, 2013 (which is herein incorporated by reference in its entirety). FIG. 3 is a flow diagram depicting an embodiment of a method 300 for obtaining such a shape-curvature-change metric.

More specifically, a wafer geometry tool may be utilized to measure wafer geometry of a given wafer before (in step 302) and after (in step 304) a process step. Once the geometry measurements of the wafer have been obtained in steps 302 and 304, step 306 may calculate the differences between the two sets of measurements. The result may be referred to as a shape-change map, and taking the second derivative of the shape-change map may provide information regarding changes in local shape curvature (LSC), resulting in a LSC map as shown in step 308.

It is contemplated that asymmetry may be estimated by performing symmetry analysis on the LSC map. For instance, polynomials such as the Zernike polynomials or the like may be fitted to the LSC map in step 310. The axisymmetric components (e.g., $Z^0_2$, $Z^0_4$, ...) obtained after the fitting process may be separated from the non-axisymmetric components in step 312. The LSC map with axisymmetric components removed may be referred to as a LSC-based asymmetry map, which can be further processed in step 314 in order to quantify the asymmetric components.

In certain implementations, the asymmetric components may be quantified based on an "asymmetry factor". The asymmetry factor may be defined as a weight of non-axisymmetric components relative to the overall polynomial fit. In other words, the asymmetry factor may help to define a degree of asymmetry induced by a given process step or a set of process steps.

It is noted, however, that knowing the asymmetry factor itself may not be enough to accurately quantify the impact of asymmetry on overlay. For example, if high-frequency intra-field components are present, these components can sometimes dominate and obscure the asymmetry which is typically defined as wafer-level (lower order) variations. A high-frequency factor may therefore be used in conjunction with the asymmetry factor to estimate the impact of asymmetry on overlay, and if the high-frequency factor is too large (greater than a pre-defined threshold), then the asymmetry factor may be weighted less. On the other hand, if the high-frequency factor is small, then the asymmetry factor may be weighted nominally. The high-frequency factor may be defined as the residuals that are unable to be captured by the polynomials fit.

In certain implementations, the IPD may be utilized as a high-frequency factor, which can be used in combination with the asymmetry factor to ascertain the impact of the asymmetry on downstream processes (e.g., overlay errors). For instance, the asymmetry factor may be multiplied by the magnitude of the IPD (e.g., 3 standard deviation, or 3-sigma) to estimate the impact of asymmetry on overlay. In this case a wafer can have high degree of asymmetry, but the overlay impact of asymmetry can be small if the magnitude of the IPD is low. On the other hand, a wafer can have low degree of asymmetry, but the impact of asymmetry can be significant if the magnitude of the IPD is high.

It is to be understood that while the IPD may be utilized as a high-frequency factor, utilization of the IPD as the high-frequency factor is not meant to be limiting. It is contemplated that other wafer geometry measurements such as shape, shape-slope, nanotopography and the like may be utilized in combination with the asymmetry factor to ascertain the impact of the asymmetry on downstream processes without departing from the spirit and scope of the present disclosure, as long as they have been suitably filtered to remove axisymmetric and low-frequency components as described above.

Figure 4:
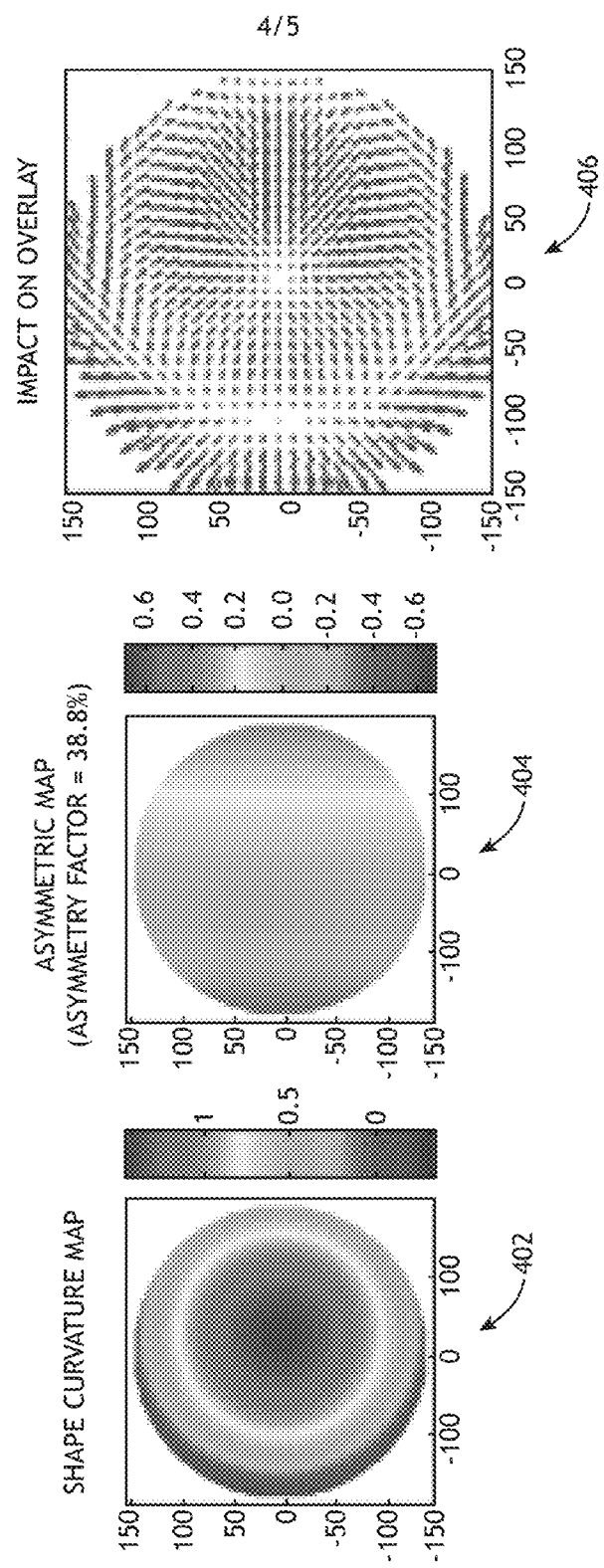
FIG. 4 is an illustration depicting an exemplary case of asymmetry detection and quantification result obtained utilizing a method configured in accordance with the present disclosure.

FIG. 4 is an illustration depicting an exemplary case of asymmetry detection and quantification result obtained. As shown in FIG. 4, an LSC map 402 may be processed in accordance with the present disclosure to obtain a corresponding asymmetry map along with a corresponding asymmetry factor 404. The obtained asymmetry map along with the asymmetry factor 404 may then be utilized in combination with the IPD information to generate a map 406 that indicates the impact of the asymmetry on overlay. It is contemplated that the map 406 may be presented to a user (e.g., a process engineer or the like) to help the user visualize the observed asymmetry signatures.

Additionally and/or alternatively, the map 406 may be utilized as a process control parameter, which may be fed forward or backward to facilitate correction of overlay errors, root-cause analysis as well as process control optimizations. For instance, the process of wafer-grouping using wafer geometry has been described in: Statistical Overlay Error Prediction for Feed Forward and Feedback Correction of Overlay Errors, Root Cause Analysis and Process Control, U.S. patent application Ser. No. 14/220,665, filed Mar. 20, 2014, which is herein incorporated by reference in its entirety. It is contemplated that instead of (or in addition to) using wafer geometry to classify wafers into different wafer groups, asymmetry maps may be utilized to facilitate the classification process as well. It is contemplated that grouping based on the asymmetry maps may help improve the accuracy of grouping, which in turn may help improve the correction of overlay errors, root-cause analysis as well as process control optimizations.

Figure 5:
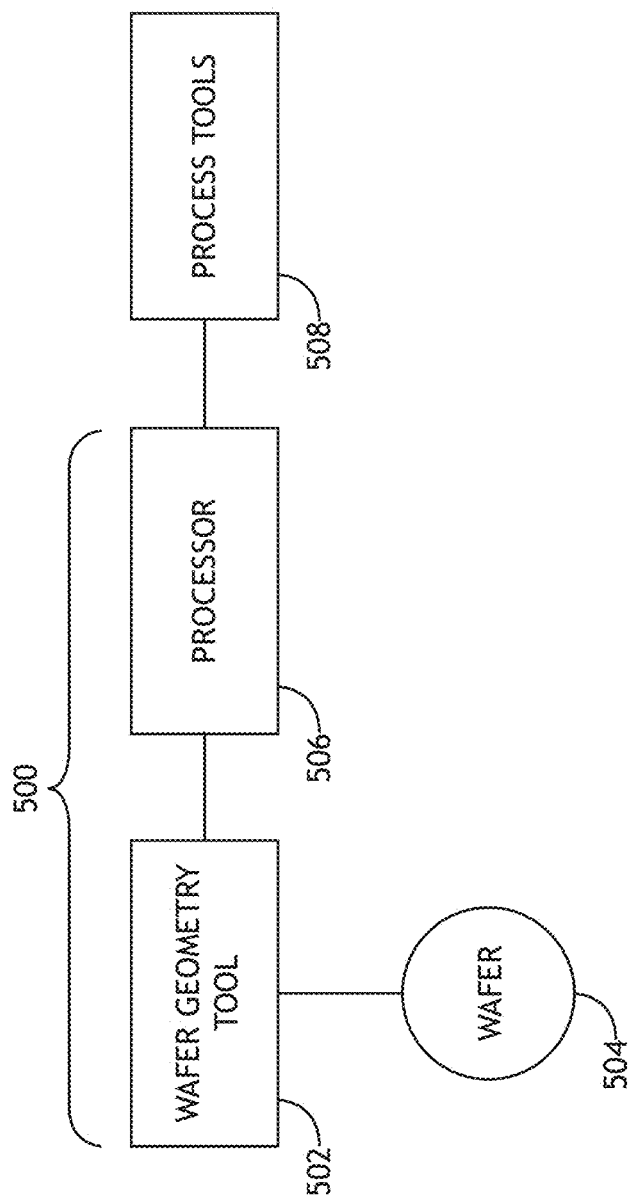
FIG. 5 is a block diagram depicting an embodiment of a process-induced asymmetry detection, quantification, and control system configured in accordance with the present disclosure.

FIG. 5 is a block diagram depicting a detection system 500 configured to detect, quantify, and control process-induced asymmetric signatures using patterned wafer geometry measurements. The detection system 500 may include a wafer geometry tool 502 configured to measure wafer geometry of a given wafer 504. The detection system 500 may also include a processor 506 in communication with the wafer geometry tool 502. The processor 506 may be configured to carry out the various analysis methods previously described. It is contemplated that the processor 506 may be implemented as a standalone processing device or as an embedded/integrated component of the wafer geometry tool 502. It is also contemplated that the processor 506 may provide its output to various process tools 508 to facilitate correction of overlay errors, root-cause analysis as well as process control optimizations as described above.

It is contemplated that the advantages provided by the systems and methods in accordance with the present disclosure may be appreciated in various applications. It is noted that both detection and quantification of asymmetry may be performed at any given process step, and the estimation can be performed purely based on wafer geometry without requiring any overlay data. It is also noted that a substantially distortion-free chuck-less wafer geometry measurement obtained at a high spatial resolution setting may improve the accuracy of the asymmetry estimation compared to conventional lithography scanners which use vacuum chucks and have much lower spatial sampling available.

It is contemplated that while some of the examples above referred to certain specific process tools, the systems and methods in accordance with the present disclosure are applicable to other types of process tools, which may also benefit from resolution-enhanced measurements without departing from the spirit and scope of the present disclosure. In addition, it is contemplated that the term wafer used in the present disclosure may include a thin slice of semiconductor material used in the fabrication of integrated circuits and other devices, as well as other thin polished plates such as magnetic disc substrates, gauge blocks and the like.

The methods disclosed may be implemented in various wafer geometry measurement tools as sets of instructions executed by one or more processors, through a single production device, and/or through multiple production devices. Further, it is understood that the specific order or hierarchy of steps in the methods disclosed are examples of exemplary approaches. Based upon design preferences, it is understood that the specific order or hierarchy of steps in the method can be rearranged while remaining within the scope and spirit of the disclosure. The accompanying method claims present elements of the various steps in a sample order, and are not necessarily meant to be limited to the specific order or hierarchy presented.

It is believed that the system and method of the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory.

What is claimed is:

1. A method, comprising:
   obtaining a first set of wafer geometry measurements of a wafer utilizing a geometry measurement tool prior to the wafer undergoing a fabrication process;
   obtaining a second set of wafer geometry measurements of the wafer utilizing the geometry measurement tool after the fabrication process;
   calculating, utilizing one or more processors, a shape-change map based on the first set of wafer geometry measurements and the second set of wafer geometry measurements;
   analyzing, utilizing the one or more processors, the shape-change map to detect an asymmetric component induced to wafer geometry by the fabrication process, wherein said analyzing step further comprises:
      calculating an in-plane distortion of the wafer at least partially based on the shape-change map;
      generating a filtered in-plane distortion map by removing symmetric components from the in-plane distortion of the wafer;
      detecting the asymmetric component at least partially based on the filtered in-plane distortion map;
      generating a local shape curvature map based on the first set of wafer geometry measurements and the second set of wafer geometry measurements;
      detecting the asymmetric component at least partially based on the local shape curvature map;
      determining an asymmetry factor based on a weight of non-symmetric components contained within the local shape curvature map;
      determining a magnitude of the in-plane distortion of the wafer;
      quantifying the impact of the asymmetric component on overlay based on a product of the asymmetry factor and the magnitude of the in-plane distortion of the wafer; and
   estimating, utilizing the one or more processors, an asymmetric overlay error induced by the fabrication process based on the asymmetric component detected in wafer geometry.

2. The method of claim 1, wherein said detecting the asymmetric component further comprises:
   generating a filtered local shape curvature map by removing symmetric components from the local shape curvature map; and
   detecting the asymmetric component at least partially based on the filtered local shape curvature map.

3. The method of claim 2, further comprising:
   quantifying an impact of the asymmetric component on overlay.

4. The method of claim 1, further comprising:
   classifying the wafer into one of a plurality of wafer groups based on at least one of: the filtered in-plane distortion map, the filtered local shape curvature map, and the impact of the asymmetric component on overlay.

5. The method of claim 1, further comprising:
   reporting at least one of: the filtered in-plane distortion map, the filtered local shape curvature map, and the impact of the asymmetric component on overlay in a feedback control for controlling a fabrication process tool that performed the fabrication process.

6. The method of claim 1, further comprising:
   reporting at least one of: the filtered in-plane distortion map, the filtered local shape curvature map, and the impact of the asymmetric component on overlay in a feed forward control for controlling a subsequent fabrication process tool.

7. A method, comprising:
   obtaining a first set of wafer geometry measurements of a wafer utilizing a geometry measurement tool prior to the wafer undergoing a fabrication process;
   obtaining a second set of wafer geometry measurements of the wafer utilizing the geometry measurement tool after the fabrication process;
   calculating, utilizing one or more processors, a shape-change map based on the first set of wafer geometry measurements and the second set of wafer geometry measurements;
   generating at least one of: an in-plane distortion map and a local shape curvature map of the wafer at least partially based on the shape-change map; and
   detecting a process-induced asymmetric component at least partially based on at least one of: the in-plane distortion map and the local shape curvature map of the wafer, wherein said detecting the process-induced asymmetric component further comprises:
      determining an asymmetry factor based on a weight of non-symmetric components contained within the local shape curvature map;
      determining a high-frequency factor based on the first set of wafer geometry measurements and the second set of wafer geometry measurements; and
      quantifying an impact of the process-induced asymmetric component on overlay based on a product of the asymmetry factor and the high-frequency factor.

8. The method of claim 7, wherein said detecting the process-induced asymmetric component further comprises:
   generating a filtered local shape curvature map by removing symmetric components from the local shape curvature map; and
   detecting the process-induced asymmetric component at least partially based on the filtered local shape curvature map.

9. The method of claim 7, wherein the high-frequency factor includes a magnitude of the in-plane distortion of the wafer.

10. The method of claim 7, further comprising:
    reporting the impact of the process-induced asymmetric component on overlay in a feedback control for controlling a fabrication process tool that performed the fabrication process.

11. The method of claim 7, further comprising:
    reporting the impact of the process-induced asymmetric component on overlay in a feed forward control for controlling a subsequent fabrication process tool.

12. A system, comprising:
    a geometry measurement tool configured to obtain a first set of wafer geometry measurements of the wafer prior to the wafer undergoing a fabrication process and to obtain a second set of wafer geometry measurements of the wafer after the fabrication process; and a processor in communication with the geometry measurement tool, the processor configured to:
calculate a shape-change map based on the first set of wafer geometry measurements and the second set of wafer geometry measurements;
analyze the shape-change map to detect an asymmetric component induced to wafer geometry by the fabrication process;
calculate an in-plane distortion of the wafer at least partially based on the shape-change map;
generate a filtered in-plane distortion map by removing symmetric components from the in-plane distortion of the wafer;
detect the asymmetric component at least partially based on the filtered in-plane distortion map;
generate a local shape curvature map based on the first set of wafer geometry measurements and the second set of wafer geometry measurements;
detect the asymmetric component at least partially based on the local shape curvature map;
determine an asymmetry factor based on a weight of non-symmetric components contained within the local shape curvature map;
determine a magnitude of the in-plane distortion of the wafer;
quantify the impact of the asymmetric component on overlay based on a product of the asymmetry factor and the magnitude of the in-plane distortion of the wafer; and
estimate an asymmetric overlay error induced by the fabrication process based on the asymmetric component detected in wafer geometry.

13. The system of claim 12, wherein the processor is further configured to:
generate a filtered local shape curvature map by removing symmetric components from the local shape curvature map; and
detect the asymmetric component at least partially based on the filtered local shape curvature map.

14. The system of claim 13, wherein the processor is further configured to:
quantify an impact of the asymmetric component on overlay.

15. The system of claim 12, wherein the processor is further configured to:
classify the wafer into one of a plurality of wafer groups based on at least one of: the filtered in-plane distortion map, the filtered local shape curvature map, and the impact of the asymmetric component on overlay.

16. The system of claim 12, wherein the processor is further configured to:
report at least one of: the filtered in-plane distortion map, the filtered local shape curvature map, and the impact of the asymmetric component on overlay in a feedback control to control a fabrication process tool that performed the fabrication process.

17. The system of claim 12, wherein the processor is further configured to:
report at least one of: the filtered in-plane distortion map, the filtered local shape curvature map, and the impact of the asymmetric component on overlay in a feed forward control to control a subsequent fabrication process tool.

* * * * *